Oct. 18, 1960 — B. M. EDSALL — 2,956,448
TORQUE CONVERTERS COMBINED WITH PLANETARY GEARING
Filed Aug. 16, 1954 — 2 Sheets-Sheet 1

INVENTOR
Bruce M. Edsall
BY W. C. Middleton
ATTORNEY

Oct. 18, 1960  B. M. EDSALL  2,956,448
TORQUE CONVERTERS COMBINED WITH PLANETARY GEARING
Filed Aug. 16, 1954  2 Sheets-Sheet 2
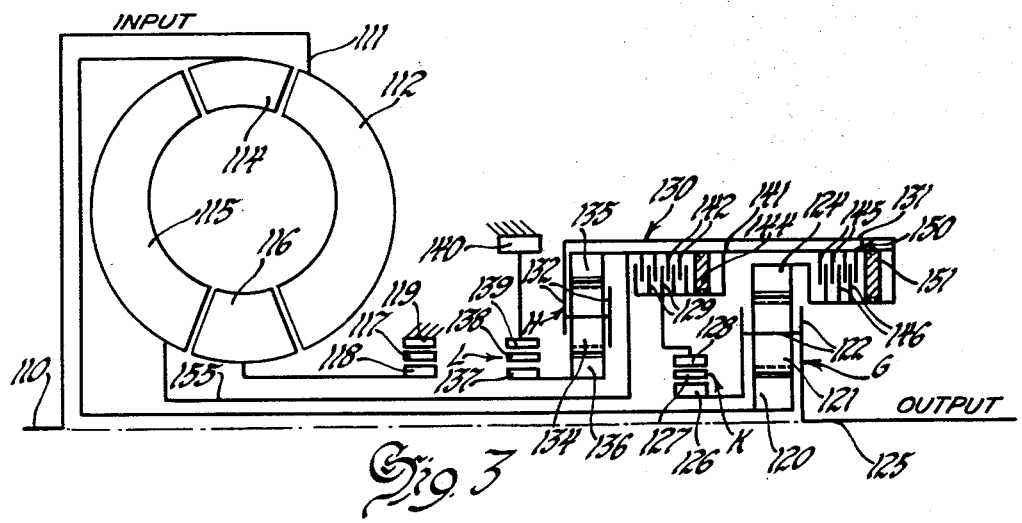
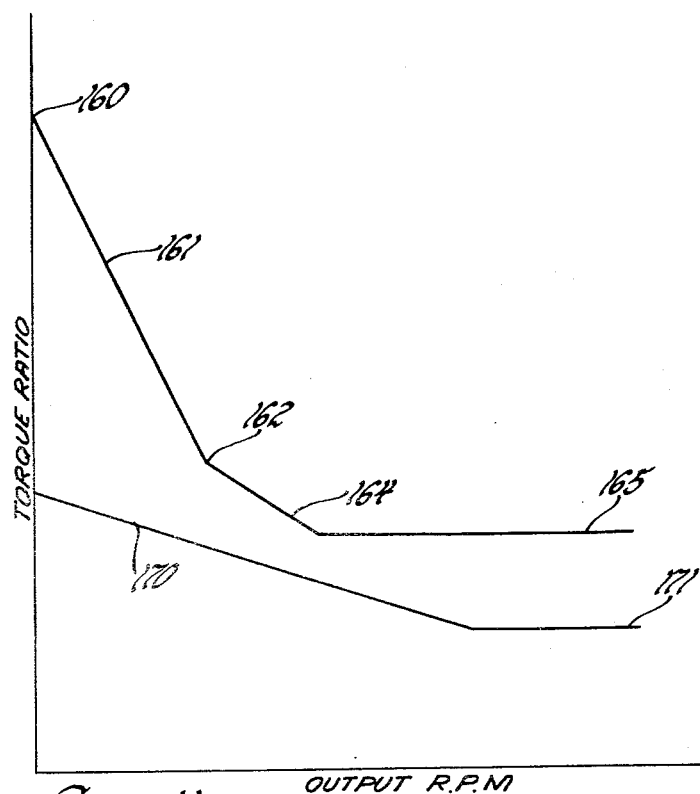
INVENTOR
Bruce M. Edsall
BY
W. C. Middleton
ATTORNEY ` United States Patent Office 2,956,448
Patented Oct. 18, 1960

2,956,448

TORQUE CONVERTERS COMBINED WITH PLANETARY GEARING

Bruce M. Edsall, Oak Park, Mich., assignor to General Motors Corporation, Detroit, Mich., a corporation of Delaware Filed Aug. 16, 1954, Ser. No. 450,047

11 Claims. (Cl. 74—677)

This invention relates to torque converters combined with planetary gearing and more particularly to multi-turbine torque converters having the turbines connected together and to load by planetary gearing.

An object of the invention is to provide a transmission assembly of twin turbine torque converter and planetary gearing so interrelated that the turbines operate to drive the output shaft through the gearing with the torques transmitted by the two turbines differentially applied to the output.

Another object of the invention is to provide an arrangement as just described in which the torque transmitted by one of the turbines is multiplied by planetary gearing prior to its imposition on the output.

Another object of the invention is to provide a transmission arrangement wherein the two turbines of a torque converter are so related to the output as to provide initial high multiplied starting torque with a lower multiplied torque which results from the differential application of the torque transmitted by each turbine to the output, which lower multiplied torque can be maintained over a wide range of operation.

A further object of the invention is to provide a multi-turbine torque converter with the turbines thereof so connected together and to the load by planetary gearing that the turbines afford mutual reaction for differential driving of the output.

A still further object of the invention is to provide a differential drive by the turbines of a torque converter of such fashion that such drive can be maintained even when the overall transmitted torque is at a 1:1 ratio.

In carrying out the foregoing and other objects of the invention, one form thereof comprises a three-element torque converter and planetary gearing. The converter has the usual pump and first and second turbines. The first turbine is connected to the input member of a planetary gear unit which also has a reaction member and an output member, in turn connected to an input member of a second planetary unit. This second planetary has a second input member and an output member which is connected to the output shaft and hence to load. A second turbine of the converter is connected directly to the second input member of the second planetary unit and is prevented from rotating in the reverse direction relative to the input member of the second planetary unit by means of a releasable one-way or free-wheeling clutch. Two of the elements of the first planetary unit can be clutched together so that the unit rotates in locked-up condition during certain phases of operation, which phases will be described later.

In another form of the invention involving a four-element torque converter the planetary arrangement is somewhat different but the fundamental principles of operation are substantially the same. This four-element converter comprises a pump, first and second turbines, and a stator or reaction member which is inhibited against reverse rotation relative to the pump and turbines by a one-way brake which permits rotation of the turbine in the same direction as the other elements, under certain conditions. In this form of the invention the first turbine is connected to the input element of a first planetary unit which has an output element connected to the output shaft of the arrangement. The third element of the planetary unit is connected to the output of a second planetary unit which has a reaction element prevented from reverse rotation by a releasable one-way brake. The third element of the second planetary unit can be connected to a race of a one-way or free-wheeling clutch, the other race of which is connected to rotate with the output element of the first planetary unit. The second turbine is connected to the same element of the second planetary unit which can be connected to the race of the one-way clutch, as just described. Clutches are provided for connecting various elements of the planetary units in such fashion as to achieve the results which will be described in detail later.

Other features, objects and advantages of the invention will be readily apparent by reference to the following detailed description of the accompanying drawings, wherein:

Fig. 3 is a schematic illustration similar to Fig. 1 of a modification of the invention; and Fig. 4 is a chart similar to Fig. 2 but related to the device shown in Fig. 3.

Fig. 1 embodiment

Figure 1:
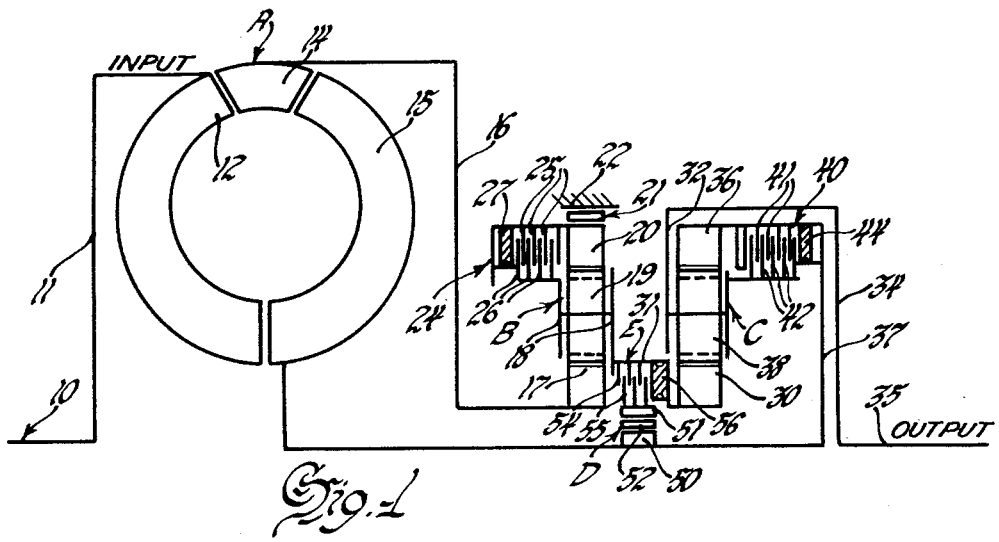
Fig. 1 is a schematic representation of one form of the invention.

Referring now to the drawings, and particularly Fig. 1, 10 indicates the input shaft which may be connected to the crank shaft of an internal combustion engine in a vehicle or may be connected to any source of motive power. The input shaft 10 may be connected by a member 11 to the pump 12 of a three-element torque converter indicated generally at A. This converter in addition to the pump 12 has a first turbine 14 and a second turbine 15. The three elements of the converter are constructed in the usual fashion, being made up of inner and outer shrouds with vanes or blades positioned therebetween.

The first turbine 14, which receives oil directly from the pump 12, is connected by connection 16 to drive the sun gear 17 of a planetary gear unit indicated generally at B. This planetary unit, in addition to the gun gear 17, has a carrier 18 supporting planet pinions 19 meshing with the sun gear 17 and with the reaction element or ring gear 20 of the planetary unit. The reaction element or ring gear 20 of this unit is prevented from rotating in one direction by a one-way brake indicated generally at 21 which acts to lock the ring gear 20 against rotation relative to the part 22 which may be the casing enclosing the entire assembly. The one-way brake may be of any well-known type, such as a roller brake or a sprag type brake. A fluid actuated clutch 24 has plates 25, in effect secured to the ring gear 20, and plates 26, in effect secured to the carrier 18. These plates may be brought into engagement to lock the ring gear 20 to the carrier 18 by a piston 27 which can be supplied with liquid under pressure in any conventional manner.

The front planetary unit B has associated therewith a rear planetary unit indicated generally at C, which unit includes a sun gear 30 connected by the connection 31 to the carrier 18 of the unit B, a carrier 32 connected by the connection 34 to the output shaft 35, and a ring gear 36. This ring gear 36 is connected by the connection 37 to the second turbine 15 of the converter A. The carrier 32 has pinions 38 meshing both with the sun gear 30 and the ring gear 36. A fluid clutch indicated generally at 40 has plates 41, in effect connected to the ring gear 36, and plates 42, in effect connected to the carrier 32. These plates can be brought into engagement for locking the ring gear 36 to the carrier 32 by a piston 44 which can be supplied with liquid under pressure in any conventional fashion.

Secured to the connection 37 between the sun gear 36 and the second turbine 15 is a race 50 of a one-way or free-wheel clutch indicated generally at D. This one-way clutch D has an outer race 51 and clutch elements 52 which may be rollers of known type or may be sprags. A clutch indicated generally at E has plates 54, in effect secured to the connection 31 between the carrier and the sun gear 30. It also has plates 55, in effect secured to the outer race 51 of the free-wheel clutch D. The plates 54 and 55 can be engaged by the application of liquid under pressure to a piston 56. When so applied the race 51 is compelled to rotate in unison with the carrier 18 and the ring gear 30.

Operation

When the input shaft 10 is rotating, drive is imparted to the pump 12 of the converter A. If the load on the output shaft is sufficiently high, the oil or other liquid expelled by the pump 12 at low speed of the engine will not cause movement of either of the turbines 14 and 15. The planetary system can then be conditioned for the type of drive desired, and for most purposes the clutches 24 and 40 will be released while the clutch E will be engaged. When the engine torque is sufficiently high, the liquid expelled by pump 12 will act on the blades of the first turbine 14 to cause rotation of this turbine in the same direction as that of the pump. When such turbine rotation begins, the sun gear 17 of the planetary unit B is rotated, while the ring gear 20 of this unit is held against backward rotation by the one-way brake 21. Due to this reaction, rotation of the sun gear 17 causes rotation of the pinions 19 and of the carrier 18 therefor. The speed of rotation of the carrier 18 is lower than that of the sun gear 17, with the difference in speeds being due to the raio of the gear unit. Rotation of the carrier 18 causes simultaneous rotation of the sun gear 30 of the planetary unit C. Forward rotation of this sun gear 30, with load on the carrier 32 from the output shaft 35, imparts a force to the ring gear 36, which force tends to move this ring gear backward relative to the direction of rotation of the sun gear. However, since ring gear 36 is connected to the race 50 of the one-way or free-wheeling clutch D, this ring gear 36 connot rotate backwardly relative to the direction of rotation of the sun gear 30. Consequently, during initial stages of operation the ring gear 36 is compelled to rotate at the same speed and in the same direction as the sun gear 30. With two elements of unit C rotating in unison, it follows that the carrier 32 must also rotate at the same speed, imparting such rotation to the ouput shaft 35.

During the initial stages of operation of the converter and the gearing, the first turbine acts to multiply engine torque, with reaction to effect this operation being supplied by the second turbine 15. The oil passing through the first turbine 14 and entering the second turbine 15 imparts a force on the blades of the second turbine which tend to move this element backwardly, but such backward movement is prevented by the one-way clutch D and the connection through the planetary B to the casing 22 by way of one-way brake 21. The second turbine therefore serves to redirect the liquid to the pump and acts as a reaction member for the first turbine. The end result of multiplication of engine torque by the first turbine and further multiplication thereof by the planetary unit B is to impart a torque higher than engine torque on the output shaft 35.

Figure 2:
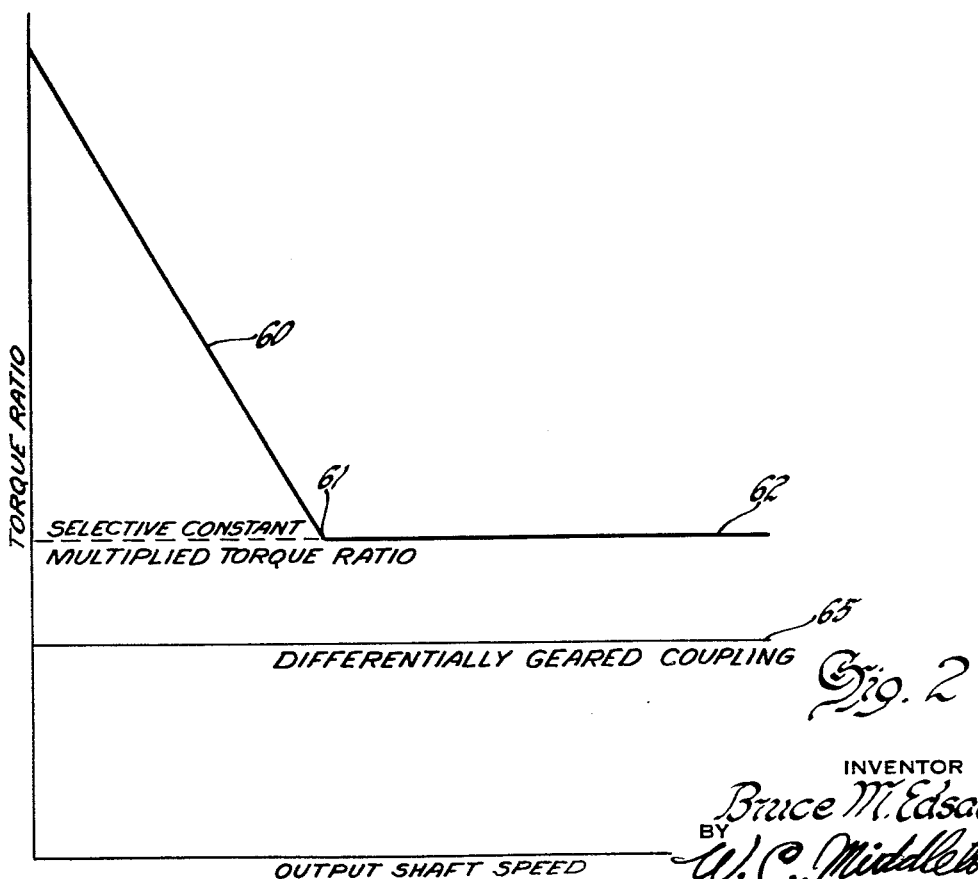
Fig. 2 is a chart illustrating the relation of torque ratio to output shaft speed during the operation of the mechanism of Fig. 1.

The muliplication of engine torque, both by the first turbine and by the planetary unit B, continues at a diminishing rate, as represented by the line 60 of Fig. 2. The upper end of this line represents the torque ratio which occurs at stall, and it will be noted that this ratio decreases at a substantially uniform rate until the point 61 is reached.

The planetary gear unit C can have differential drive applied thereto by the sun gear 30 and the ring gear 36 when appropriate conditions are attained. So long as the ring gear 36 is compelled by the one-way clutch D to rotate at the same speed as the sun gear 30, the differential relation is ineffective. However, when a speed of operation of the converter is reached which causes the second turbine 15 to transmit a specific part of the engine torque, determined by the gear ratios, the second turbine 15 will rotate faster than the sun gear 30 which is being rotated by the first turbine through the reduction gearing afforded by unit B. When the connecting link 37 rotates faster than the sun gear 30 it is permitted to free wheel relative to the sun gear 30 by the clutch D so that ring gear 36 is then rotating at a faster rate than the sun gear 30. Such increased rate of rotation tends to force the sun gear 30 to rotate backwardly, with respect to the ring gear 36, with the final result that its forward speed of rotation is reduced, thereby reducing the speed of rotation of the first turbine 14. Due to the nature of the hydraulic forces in the converter A, a reduction in the speed of rotation of the first turbine 14 increases the torque transmitted thereby. Likewise an increase in speed of rotation of the second turbine reduces the torque transmitted thereby since in this phase of operation of the converter it is acting as a fluid coupling rather than as a torque multiplying converter. While the second turbine 15 can act as a reaction member for the first turbine 14 to assist the first turbine in multiplying torque, the second turbine 15 cannot multiply torque since a stator or reaction member is not present for this purpose. It follows, therefore, that as soon as the second turbine assumes the transfer of a specific part of the torque, multiplication within the converter ceases and the total torque transmitted by the two turbines is equal to the engine torque less the amount of inherent loss or slip in the device.

Assuming for purposes of illustration that total engine torque is being transmitted in the converter during operation as a coupling, still a multiplied engine torque can be imposed on the output shaft 35. This is due to the fact that the portion of engine torque being transmitted by the first turbine is multiplied in the planetary unit B and is imposed on the planetary unit C through the sun gear 30. The proportion of engine torque transmitted by the first turbine during this phase of operation depends on the ratio of unit B and the ratio of pitch diameters between the sun gear 30 and the ring gear 36 of the rear planetary unit C. If the geartooth forces are in balance, the torque transmitted by the second turbine 15 is equal to the torque transmitted by the first turbine 14 multiplied by the ratio of the unit B and by the ratio of pitch diameters, previously mentioned. With these facts in mind, the proportion of engine torque which is transmitted by each turbine in the coupling phase of operation of the converter can be computed knowing the gear ratio of the front unit B and the ratio of pitch diameters in the unit C.

Summarizing the operation of the converter to impart differential drive to the output shaft, we find that when the second turbine attains an overrunning speed relative to the speed of sun gear 30, it operates to slow down the speed of rotation of the first turbine through the unit C until hydraulic balance has been achieved in the converter, that is, until the two turbines afford mutual reaction, one directly to the rear planetary unit C and the other through reduction gearing thereto. During such differential drive the torque imposed on the output shaft 35 is equal to the second turbine proportion of engine torque added to the first turbine proportion of engine torque multiplied by the ratio of the front unit B. With this differential drive therefore a torque greater than engine torque is continuously applied to the output shaft 35, as represented by the line 62 of Fig. 2.

If multiplied torque is not required on the output shaft, such as at high vehicle speeds with relatively light load, the transmission can be conditioned to cause substantially engine torque to be imposed on the output shaft 35. The ratio of torque transmission approaches a 1:1 ratio. This approximate 1:1 ratio, which is represented by the line 65 of Fig. 2, can be obtained by engaging the clutch 24 in the front unit B which causes this unit to operate in direct drive and by releasing the clutch E, thereby preventing this clutch from compelling the second turbine to rotate at the same speed as the sun gear 30. In practice it has been found that the two turbines will always find a speed ratio therebetween which allows them to furnish mutual reaction so that the output shaft will have imparted thereto only the sum of the torque transmitted by the two turbines.

With this arrangement it is possible to provide efficient drive at a 1:1 ratio, and by changing the condition of the clutches 24 and E, to obtain the added acceleration which may be desirable under some circumstances. For example, if the transmission is operating at a 1:1 ratio with clutch 24 engaged and clutch E disengaged, torque multiplication differentially supplied by the two turbines can be obtained by disengagement of clutch 24 and engagement of clutch E.

In the foregoing discussion of the operation of this mechanism, clutch 40 has been described as being disengaged. In fact, for the operation as described, this clutch can be omitted since the only purpose thereof is to obtain a coupling drive by the second turbine with the first turbine floating in the fluid circuit within the converter. Should clutch 40 be engaged it will lock up the rear planetary unit C since it compels the carrier 32 and the ring gear 36 to rotate in unison. Consequently, during initial stages of drive, torque multiplication will be afforded by the first turbine 14 acting through the planetary unit B to drive the sun gear 30 of the unit C. The second turbine will be compelled to rotate at the same speed as the sun gear 30 since the second turbine is connected to the ring gear 36. When the second turbine 15 assumes the torque load it will rotate faster than sun gear 30 and will transmit drive directly to the output shaft 35. In this operation the sun gear 30 can rotate with the other two elements of unit C at a faster rate than it would be driven by the first turbine 14; such increased speed of rotation being permitted by the one-way brake 21.

However, in actual practice it has been found that drive as just described does not possess the advantages of the differential drive which has been described hereinbefore. It has been found in tests that when the first turbine blade exit angle is high, for the production of greater torque multiplication thereby, a more efficient coupling action is produced with the differential gear and with both turbines transmitting torque than is produced by an arrangement wherein the first turbine free wheels without transmitting torque.

*Filg. 3 embodiment*

In Fig. 3 a modification of the invention has been illustrated. In this embodiment use is made of a four-element torque converter which includes a stator or reaction member which is inhibited against reverse rotation but is free to rotate in the same direction as the other elements. Again 110 indicates the input shaft which may be the crank shaft of the usual engine. This input shaft is connected by the connection 111 to the pump 112 of the torque converter. This converter also has a first turbine 114 and a second turbine 115. The additional element comprises the stator 116 which is held against reverse rotation by the one-way brake elements 117, positioned between inner and outer races 118 and 119. The outer race 119 can be connected to the casing for the transmission.

The first turbine 114 is connected to drive the sun gear 120 of rear planetary unit G. In addition to the sun gear 120, the planetary unit G has pinions 121 mounted for rotation on carrier 122 and ring gear 124. The carrier 122 is connected to output shaft 125 and also to an inner race 126 of a one-way free-wheeling clutch K having elements 127 and an outer race 128. The outer race has connected thereto plates 129 of a clutch 130. Ring gear 124 is connected by the connection 131 to the carrier 132 of a front planetary unit H. This unit H also has pinions 134 rotatably mounted on the carrier 132, a ring gear 135, and a sun gear 136 which is connected to the inner race 137 of a one-way clutch or brake L having elements 138 and an outer race 139. This outer race can be locked to the casing of the transmission by a conventional brake band 140 or may be released for certain purposes.

The ring gear 135 of gear unit H has a connecting member 141 secured thereto, and this member 141 has a plurality of clutch plates 142 cooperating with plates 129 to lock the outer race 128 to the ring gear 135. A piston 144 can be supplied with liquid to engage these plates. The connecting member 141 also has a plurality of clutch plates 145 cooperating with plates 146 secured to the connecting member 131 to comprise a clutch 150. These plates can be engaged by hydraulically operated piston 151.

The second turbine 115 is connected by the connection 155 to the connecting member 141 so that it may be said that the second turbine is connected directly to the ring gear 135 and also can be connected through the clutch 130 to the race 128.

*Operation*

The transmission just described is normally operated as follows. The band 140 is applied to lock the outer race 139 of brake L against movement. The clutch 130 is applied to lock the outer race 128 of clutch K to the ring gear 135. Clutch 150 is released. When power is supplied by the input shaft 110 its rotation causes rotation of the converter pump 112. At stall, the two turbines 114 and 115 and the reaction member or stator 116 are stationary. Due to the nature of the blading of the first turbine the second turbine torque will be very low or even negative at stall. When the pump 112 attains a speed high enough to cause the first turbine 114 to be rotated, such rotation will drive the sun gear 120 of the rear planetary unit G. Since the load of the vehicle is on the output shaft 125, the carrier 122 connected to the output shaft serves as a reaction member so that rotation of the sun gear will tend to drive the ring gear 124 in the reverse direction. Ring gear 124 being connected to the carrier 132 of the front unit H, the force tending to move the ring gear 124 in the reverse direction is applied in equal manner to the carrier 132. Since the sun gear 136 of the front unit is prevented from rotating in the reverse direction by the one-way brake L, this force on the carrier 132 imposes a force tending to move the ring gear 135 in the reverse direction. Such movement, however, is opposed by the one-way clutch K since the race 128 of clucth K is clutched to the ring gear 135. The torque applied to the outer race 128, both by the gearing and the second turbine 115, tending to drive the carrier 122 backwardly, is not sufficient to overcome the torque in the forward direction imposed on the carrier 122 by the sun gear 120. The result is that the two gear sets G and H act as a compound planetary gear set in which the ring gear 135 is attached to the carrier 122. Consequently, the carrier 122 and the output shaft are rotating in the forward direction.

The torque multiplied by the first turbine 114 and applied to the sun gear 120 is further multiplied by the action of the compound planetary gear set and imposed on the output shaft 125. Therefore, a high initial starting torque is provided which diminishes from the peak indicated at 160 along the line 161 to the point 162.

As the output shaft speed increases, the second turbine 115 begins to assume some of the torque load. A point will be reached at which the second turbine 115 will rotate faster than the output shaft, which rotation is permitted by the one-way clutch K. The relative distribution of torque between the two turbines, at which the overriding of the second turbine, so far as drive on the output shaft is concerned, depends on the gear set ratios. The relationship of the ring gear 124 and the sun gear 120 determines the torque relationship required to maintain a balance on the differential application of torque which now takes place in driving the carrier 122 and the output shaft 125. The torque on the ring gear 124 is a function of the front planetary gear set H and consequently, once the second turbine has overrun the output shaft, the torque transmitted by the second turbine is multiplied in the gear set H before being fed to the ring gear 124. As the second turbine 115 speeds up it reduces the speed and increases the torque of the first turbine 114, which creates a hydraulic balance in the converter. Since the stator 116 will remain stationary so long as the second turbine 115 is multiplying torque, it follows that the torque transmitted to the output shaft is a combination of the multiplied torque transmitted by the two turbines as well as the multiplication of the second turbine-transmitted torque by the gear set H. During this phase of operation both turbines serve to multiply torque, but as their speeds of rotation increase the torque so delivered to the output shaft is of diminishing value, as indicated by the straight line 164 of Fig. 4.

A point will be reached at which multiplication of torque within the converter ceases and the flow of fluid therein is of such nature as to cause the stator 116 to rotate in the same direction as the pump and the two turbines. When such occurs, engine torque is no longer multiplied within the converter, but the torque transmitted by the two turbines and imposed in differential fashion on the carrier 122 is engine torque with the proportion of torque transmitted by the second turbine being multiplied by the planetary gear set H. The end result is a torque, greater than engine torque, on the output shaft 125 of constant magnitude, as represented by the line 165 of Fig. 4. This straight line of course is based on the assumption that the engine torque is constant.

The transmission has still further phases of operation which can be obtained by releasing the clutch 130 and by releasing the band 140 which removes the inhibition preventing rearward rotation of the sun gear 136. At the same time clutch 150 is engaged which locks the carrier 132 to the ring gear 135 so that the planetary unit H will have its elements rotating in unison. In this phase, which occurs at low output speeds, the torque split between the first and second turbines is determined solely by the rear gear set G since the first turbine drives the sun gear 120 directly and the second turbine drives the ring gear 124 directly, due to engagement of clutch 150. Any torque multiplication which is obtained in this phase of operation and which is represented by the line 170 of Fig. 4 is only that due to the reaction afforded by the stator 116.

When the stator free wheels and the converter is functioning as a coupling with no torque multiplication whatsoever, the effect of the differential drive by the two turbines on the output shaft is the transmission of torque at a substantially 1:1 ratio, as indicated by the line 171 of Fig. 4.

From the foregoing it will be seen that the present invention, in each of the modifications illustrated and described, provides an arrangement whereby the two turbines of a torque converter are so interconnected and connected to load that the first turbine can supply an initial high starting torque, after which the two turbines cooperate to drive the output in differential fashion, either with multiplied torque or with substantially engine torque. In this fashion both turbines operate to transmit torque instead of the first turbine being caused to free wheel and offer some impediment to the efficient operation of the device.

It is to be understood that further modifications beyond those illustrated herein can be made, and therefore any limitations are to be only those set forth in the following claims.

What is claimed is:

1. In a transmission of the type described, an input shaft, an output shaft, a torque converter having a pump driven by said input shaft and having first and second turbines, a gear unit having an output element connected to drive said output shaft, and having input elements drivably connected to drive said output element, releasable one-way driving means for compelling said second turbine to rotate in the same direction as said first turbine, at least, at a predetermined speed ratio relative to said output shaft, said turbines being drivably connected respectively for drive to and from said input elements and to afford mutual reaction for differentially driving said output element.

2. In a transmission of the type described, an input shaft, an output shaft, a torque converter having a pump driven by said input shaft and having first and second turbines, a gear unit having an output element connected to drive said output shaft, and having input elements drivably connected to drive said output element, releasable one-way driving means for compelling said second turbine to rotate in the same direction as said first turbine, at least, at a predetermined speed ratio relative to said output shaft, said turbines being drivably connected respectively for drive to and from said input elements and to afford mutual reaction for differentially driving said output element, and gear means for multiplying input shaft torque for application to said output element.

3. In a transmission of the type described, an input shaft, an output shaft, a torque converter having a pump driven by said input shaft and having first and second turbines, a gear unit having an output element connected to drive said output shaft, and having input elements drivably connected to drive said output element, releasable one-way driving means for compelling said second turbine to rotate in the same direction as said first turbine, at least, at a predetermined speed ratio relative to said output shaft, said turbines being drivably connected respectively for drive to and from said input elements and to afford mutual reaction for differentially driving said output element, gear means for multiplying the torque transmitted by one of said turbines for application to said output element, and means for interrupting the multiplication of torque by said gear means.

4. In a transmission of the type described, an input shaft, an output shaft, a torque converter having a pump driven by said input shaft and having first and second turbines, a pair of planetary gear units, one of said units having an output element connected to drive said output shaft, the other of said units including a releasable reaction element and a lock-up clutch, and having input elements, releasable one-way driving means for compelling said second turbine to rotate in the same direction as said first turbine, at least, at a predetermined speed ratio relative to said output shaft, said gear units being interconnected, and drive connections between said units and said turbines for drive from and to said turbines whereby said turbines transmit torque individually to said input elements and afford mutual reaction for differentially driving said output element.

5. In a transmission of the type described, an input shaft, an output shaft, a torque converter having a pump driven by said input shaft and having first and second turbines, a pair of planetary gear units, one of said units having an output element connected to drive said output shaft, the other of said units including a releasable reaction element and a lock-up clutch, and having input elements, said gear units being so interconnected and connected to said turbines that said first turbine initially drives one of said input elements with the torque transmitted by said first turbine being multiplied to drive said output element, and one-way clutch means between said gearing and said second turbine compelling said second turbine to rotate in the same direction as said first turbine and at a predetermined speed ratio.

6. In a transmission of the type described, an input shaft, an output shaft, a torque converter having a pump driven by said input shaft and having first and second turbines, a pair of planetary gear units, one of said units having an output element connected to drive said output shaft, and having input elements, the other of said units including a releasable reaction element and a lock-up clutch, said gear units being so interconnected and connected to said turbines that said first turbine initially drives one of said input elements with the torque transmitted by said first turbine being multiplied to drive said output element, and one-way clutch means between said gearing and said second turbine compelling said second turbine to rotate in the same direction as said first turbine and at a predetermined speed ratio, said one-way clutch means permitting said second turbine to rotate faster than said predetermined ratio to transmit torque to the second of said input elements, whereby said turbines apply torque differentially to said output element.

7. In a transmission of the type described, an input shaft, an output shaft, a torque converter having a pump driven by said input shaft and having first and second turbines, a planetary gear unit having an output element connected to drive said output shaft, and having first and second input elements, a torque multiplying gear unit having its input connected to said first turbine and its output connected to the first of said input elements, said second turbine being connected to the second of said input elements, and a releasable one-way clutch between said second turbine and the first of said input elements, compelling said second turbine to rotate in the same direction as said first turbine while the torque transmitted by the second turbine is at low value.

8. In a transmission of the type described, an input shaft, an output shaft, a torque converter having a pump driven by said input shaft and having first and second turbines, a planetary gear unit having an output element connected to drive said output shaft, and having first and second input elements, a torque multiplying gear unit having its input connected to said first turbine and its output connected to the first of said input elements, said second turbine being connected to the second of said input elements, a releasable one-way clutch between said second turbine and the first of said input elements, compelling said second turbine to rotate in the same direction as said first turbine while the torque transmitted by the second turbine is at low value, said one-way clutch permitting said second turbine to rotate faster than the first of said input elements to apply the torque transmitted by the second turbine to the second of said input elements in differential relation to the multiplied torque transmitted by said first turbine to the first of said input elements, means for causing said torque multiplying gear unit to operate in direct drive, and means for releasing said one-way clutch whereby only the torque transmitted by said turbines is applied respectively to said input elements in differential relation.

9. In a transmission of the type described, an input shaft, an output shaft, a torque converter having a pump driven by said input shaft and having first and second turbines, a first planetary gear unit having an output element connected to drive said output shaft, and having first and second input elements, a second planetary gear unit compounded with said first gear unit and having a reaction element, means for releasably holding said reaction element against reverse rotation, the output of said second gear unit being connected to the second of said input elements, said first turbine being connected to the first of said input elements, said second turbine being connected to the input of said second gear unit, a releasable one-way clutch between said second turbine and said output element compelling said second turbine to rotate therewith when the torque transmitted by said second turbine is of low value, whereby said compounded gear units cause the torque transmitted by said first turbine to the first of said input elements to be multiplied on said output element.

10. In a transmission of the type described, an input shaft, an output shaft, a torque converter having a pump driven by said input shaft and having first and second turbines, a first planetary gear unit having an output element connected to drive said output shaft, and having first and second input elements, a second planetary gear unit compounded with said first gear unit and having a reaction element, means for releasably holding said reaction element against reverse rotation, the output of said second gear unit being connected to the second of said input elements, said first turbine being connected to the first of said input elements, said second turbine being connected to the input of said second gear unit, a releasable one-way clutch between said second turbine and said output element compelling said second turbine to rotate therewith when the torque transmitted by said second turbine is of low value, whereby said compounded gear units cause the torque transmitted by said first turbine to the first of said input elements to be multiplied on said output element, said one-way clutch permitting said second turbine to rotate faster than said output element, whereby the torque transmitted by said second turbine is applied through said second gear unit to the second of said input members in differential relation to the torque applied to the first of said input elements.

11. In a transmission of the type described, an input shaft, an output shaft, a torque converter having a pump driven by said input shaft and having first and second turbines, a first planetary gear unit having an output element connected to drive said output shaft, and having first and second input elements, a second planetary gear unit compounded with said first gear unit and having a reaction element, means for releasably holding said reaction element against reverse rotation, the output of said second gear unit being connected to the second of said input elements, said first turbine being connected to the first of said input elements, said second turbine being connected to the input of said second gear unit, a releasable one-way clutch between said second turbine and said output element compelling said second turbine to rotate therewith when the torque transmitted by said second turbine is of low value, whereby said compounded gear units cause the torque transmitted by said first turbine to the first of said input elements to be multiplied on said output element, said one-way clutch permitting said second turbine to rotate faster than said output element, whereby the torque transmitted by said second turbine is applied through said second gear unit to the second of said input members in differential relation to the torque applied to the first of said input elements, and means for conditioning said compounded gear units to cause the torque transmitted by said turbines to be directly imposed respectively on said input elements in differential relation.

References Cited in the file of this patent

UNITED STATES PATENTS

| | | |
|---|---|---|
| 2,316,390 | Biermann | Apr. 13, 1943 |
| 2,381,772 | Pentz | Aug. 7, 1945 |
| 2,599,336 | Lemon | June 3, 1952 |
| 2,627,764 | Mayner | Feb. 10, 1953 |
| 2,671,357 | Foley | Mar. 9, 1954 |
| 2,716,906 | Seybold | Sept. 6, 1955 |
| 2,768,537 | Seybold | Oct. 30, 1956 |
| 2,811,872 | Seybold | Nov. 5, 1957 |

FOREIGN PATENTS

| | | |
|---|---|---|
| 666,092 | Great Britain | Feb. 6, 1952 |